Figure 1:
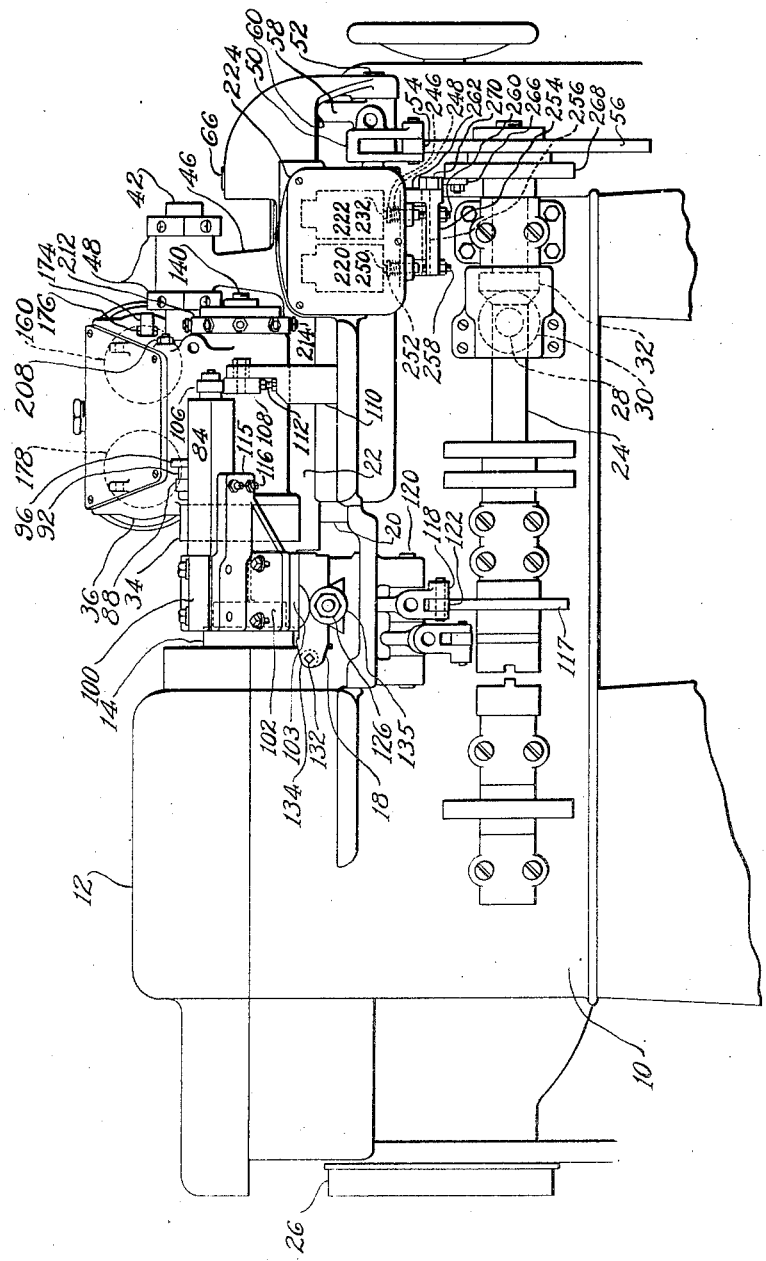

April 4, 1944.　　　C. A. RICH ET AL　　　2,345,686

SCREW AND SIMILAR MACHINE

Filed Feb. 10, 1941　　　5 Sheets-Sheet 5

Witness
Paul F. Bryant

Inventors
Charles A. Rich
William E. Twombly
& Fred Hildreth

Patented Apr. 4, 1944

2,345,686

UNITED STATES PATENT OFFICE 2,345,686

SCREW AND SIMILAR MACHINE

Charles A. Rich and William E. Twamley, Providence, R. I., assignors to Brown and Sharpe Manufacturing Company, a corporation of Rhode Island Application February 10, 1941, Serial No. 378,258

29 Claims. (Cl. 29—43)

The present invention relates to improvements in automatic machines for fashioning articles successively from bar stock, and more particularly to an improved tool actuating and supporting mechanism for use in a machine of this general description.

Where automatic screw and similar machines have been employed for the manufacture of small and delicately formed parts, it has been found that the forming tools ordinarly employed tend to place an objectionably heavy strain upon the relatively small gauge stock with consequent inaccuracies and failures in operation of the machine. Experience has shown that a greater degree of accuracy of operation may be obtained by the use of tools adapted for single point turning in the manufacture of such articles. Accordingly, it is a principal object of the present invention to provide in an automatic machine of this general description, a novel and improved tool supporting and actuating assembly which is particularly adapted for the performance of a series of single point turning operations for the fashioning of each successive work piece.

More specifically, it is an object of the invention to provide a tool supporting assembly including a turret capable of mounting a relatively large number of tools suitable for single point turning and for controlling the operation of the turret to cause each tool in succession to perform the turning operation required of it for the fashioning of each successive work piece.

Other objects of the invention are to provide certain improvements in construction and arrangement of the several cooperating devices constituting the tool supporting and actuating assembly, which will better adapt these devices for the performance of their several functions, and will contribute to secure a continuous and fully automatic operation of this assembly in a machine of the type described.

With these and other objects in view as may hereinafter appear, a principal feature of the invention consists in the provision in an automatic machine of the type described, of a tool supporting assembly including a turret mounting a number of single point turning tools, together with supporting structure for the same capable of bringing the tools successively into operating position, and for imparting to each tool in succession the required movements axially of the work and transversely thereof for the performance of the several turning operations required for the fashioning of each successive work piece.

Other features of the invention relate to the provision of a novel construction and arrangement of the automatic operating means for the tool supporting assembly including cam and follower elements adapted for effecting the required positioning movements of the turret axially of and transversely of the work, and additional automatic means operating in timed relation thereto for indexing and for locking the turret in each of its successive indexed positions.

Certain features of the invention relate more specifically to the construction and arrangement of the indexing and locking mechanism for the turret which permits of a remote control of the turret indexing operation in timed relation to the movements of the tool slide and turret support.

Figure 2:
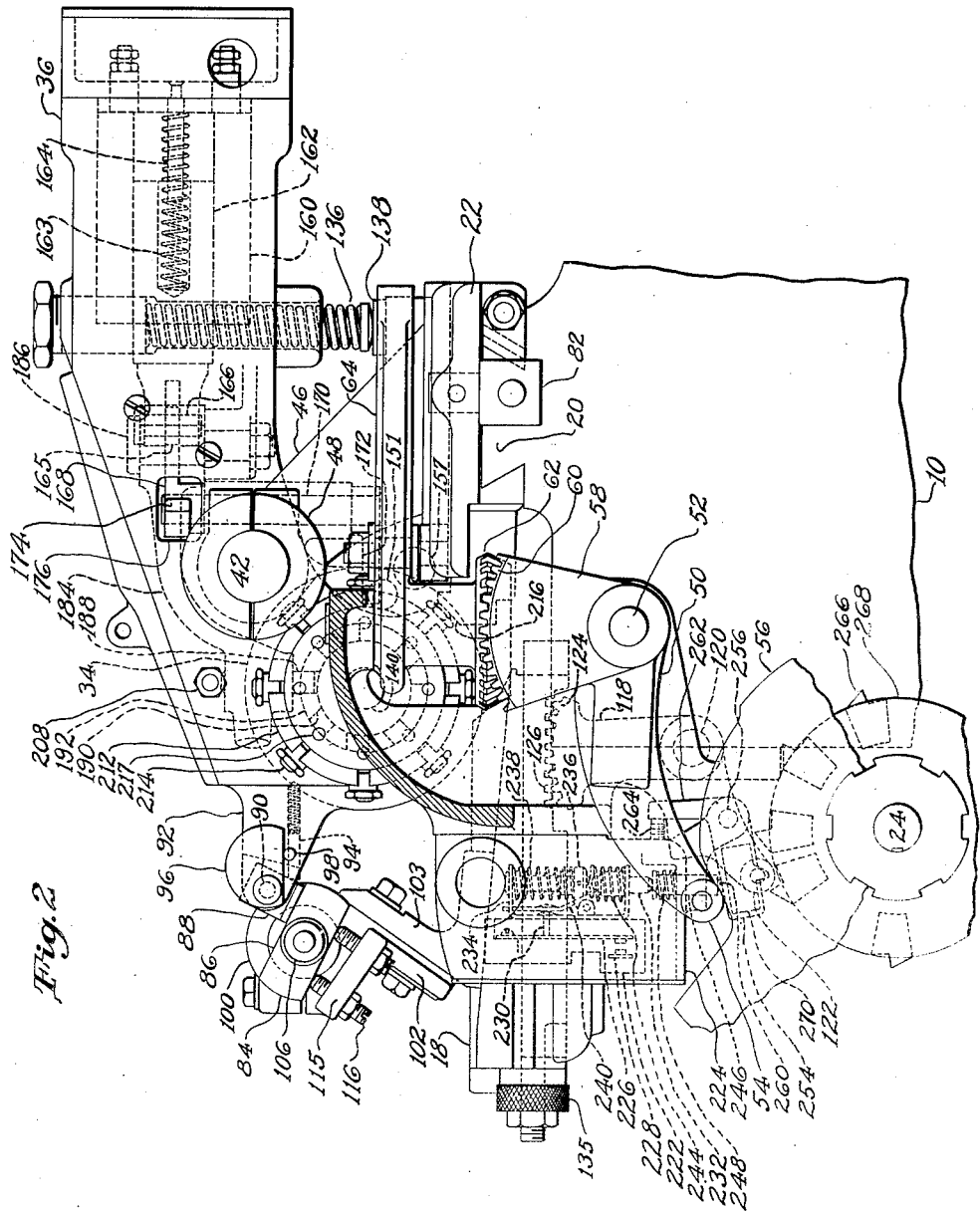
Figure 3:
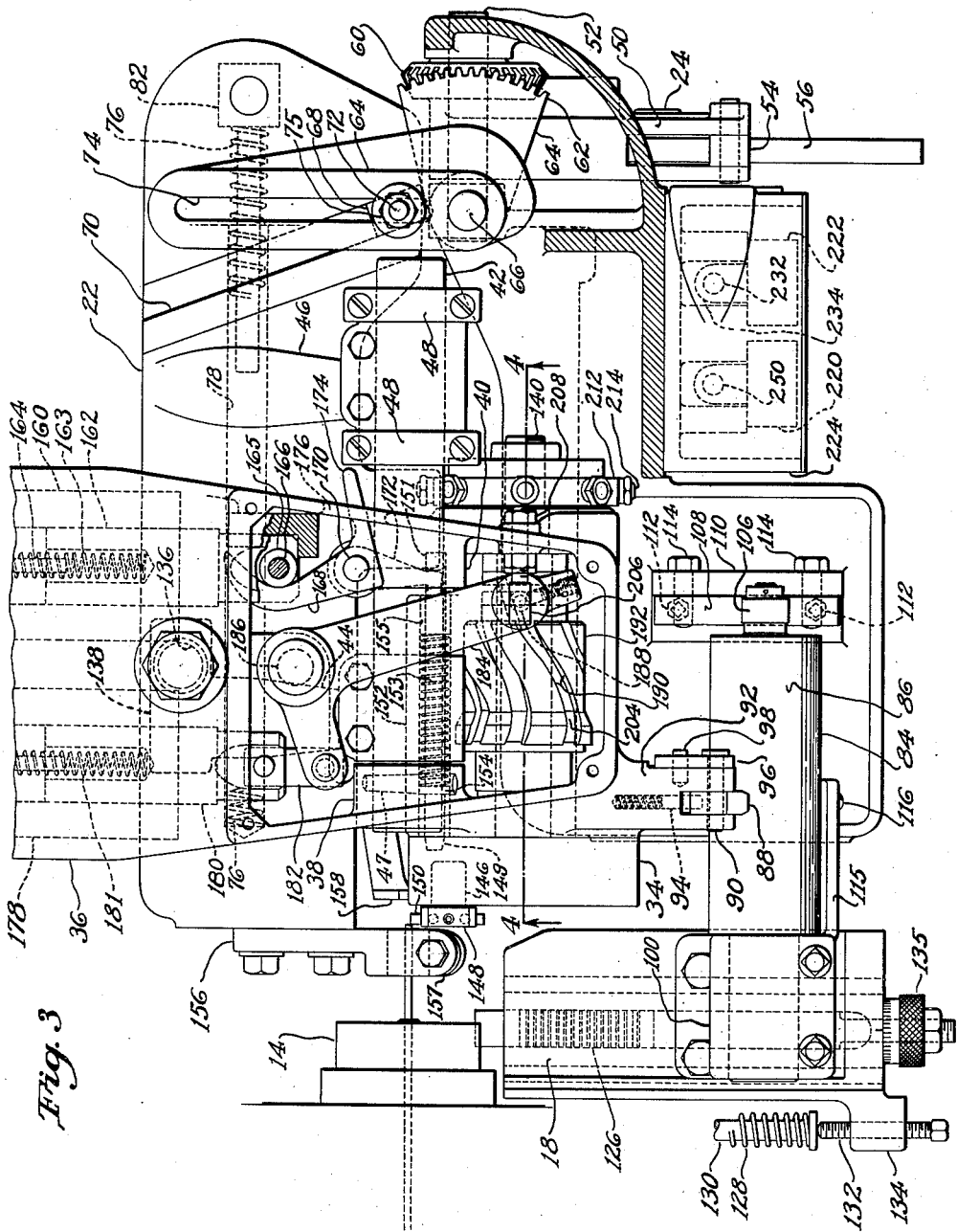
Figure 4:
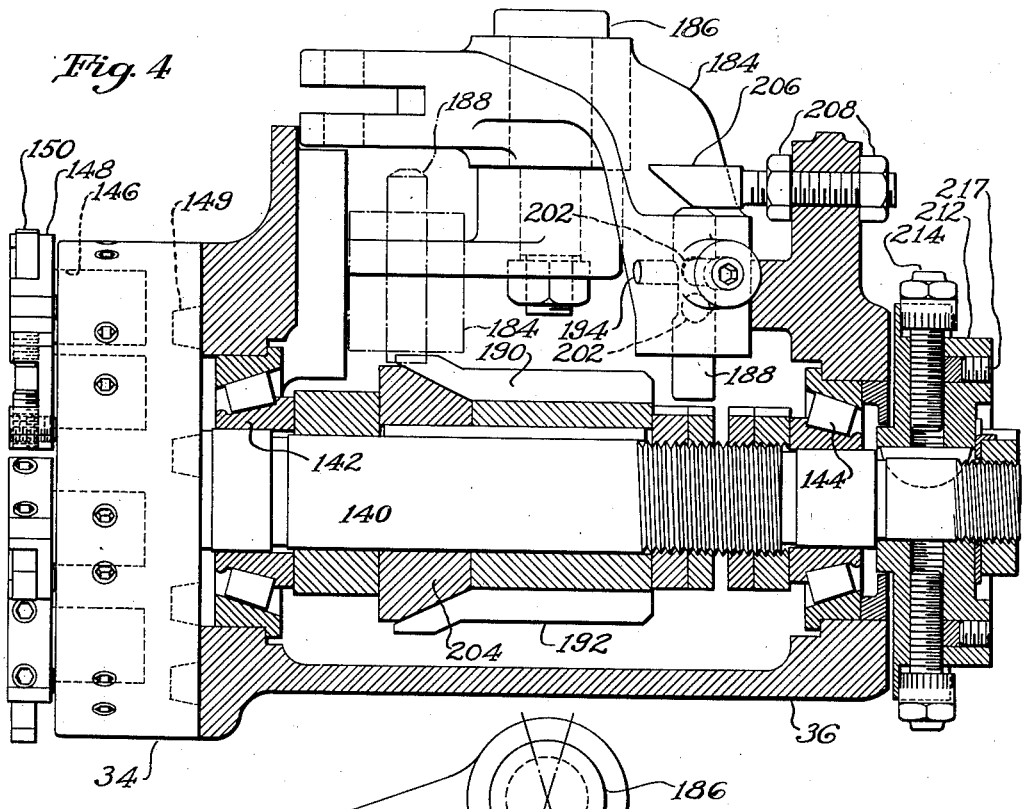
Figure 6:
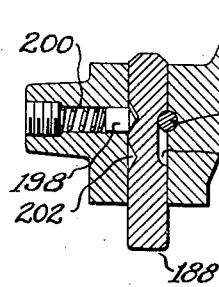
Figure 5:
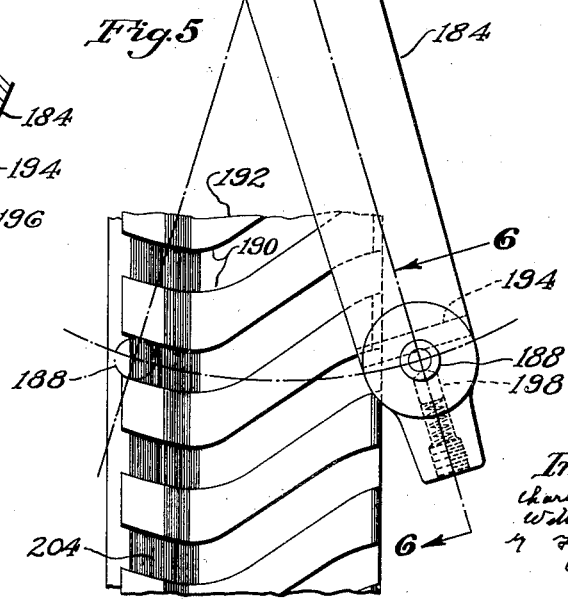
Figure 7:
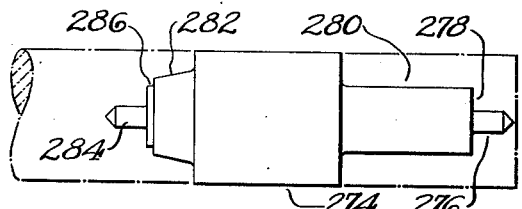
Figure 9:
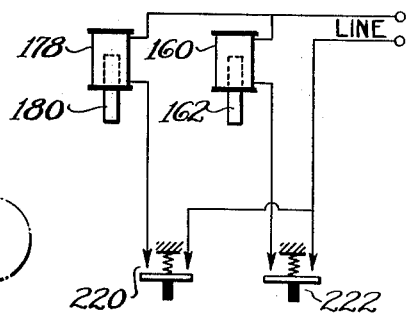
Figure 8:
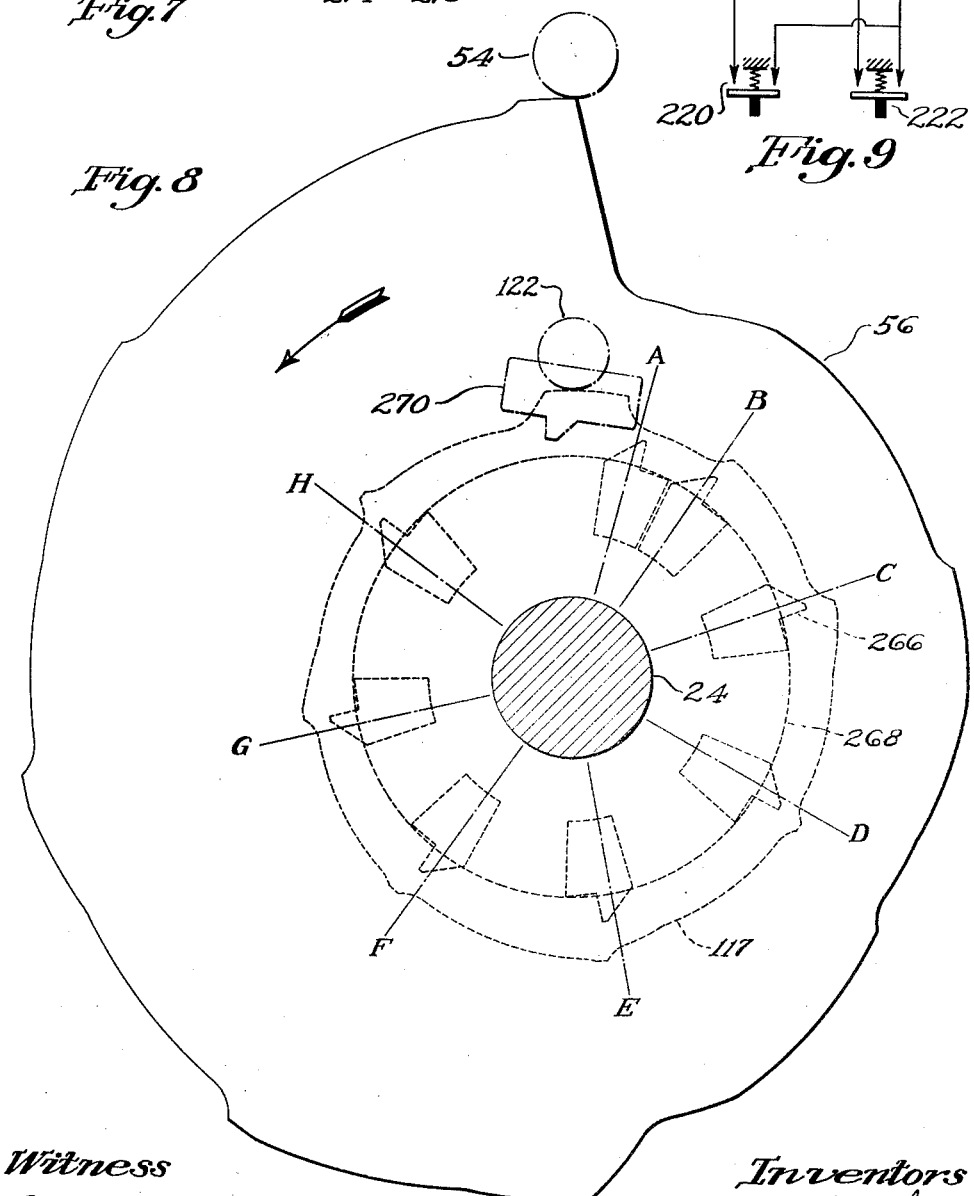

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of an automatic screw machine embodying in a preferred form the features of applicants' invention, only so much of the machine being shown as is necessary to illustrate the connection of the present invention therewith; Fig. 2 is a partial end view of the machine looking from the right of Fig. 1, and with a portion of the casing broken away to illustrate particularly the tool suporting and actuating assembly; Fig. 3 is a plan view of substantially the parts shown in Fig. 2, with a portion of the casing broken away and shown in section, and with the cover of the turret rocker support removed to illustrate particularly the turret indexing and locking mechanisms; Fig. 4 is a still further enlarged detail view in front elevation, taken on the section line 4—4 of Fig. 3, illustrating particularly the tool supporting turret and associated parts in the turret rocker support; Fig. 5 is a detail plan view of the indexing lever in connection with a developed view of the spiral cam element for indexing the turret; Fig. 6 is a detail section view taken on the line 6—6 of Fig. 5, illustrating particularly the follower element associated with the indexing lever, the element being shown in its low operative position; Fig. 7 is a view in side elevation of a finished work piece with the bar stock from which it is cut shown in relation thereto in dot-and-dash lines; Fig. 8 is a diagrammatic view on an enlarged scale of the arrangement of the operating cam for the tool slide and for the turret rocker support, and the dogs for initiating a successive turret indexing operation capable of producing the staff illustrated in Fig. 7; and Fig. 9 is a diagram of the electrical connections for controlling the operation of the turret indexing and locking devices.

The present invention is herein disclosed as embodied in an automatic screw machine of the general description which comprises a spindle assembly adapted for continuously rotating bar stock and for feeding successive portions of the same to the operating tools, and one or more tool slides movable transversely or axially of the work. The present machine is also provided with the usual driving and timing mechanisms common to these machines for positioning the work and for moving the tool slides and tools mounted thereon to perform the several fashioning operations upon each work piece and for feeding the work. In accordance with the usual practice in these machines, it is contemplated that all of the operations of rotating and feeding the work and for causing the several forming tools to perform their required functions for the fashioning of the several work pieces will be performed as part of a continuous and fully automatic operation.

In order to adapt an automatic screw machine of the general type described, for the performance of a series of single point turning operations on each of successively presented work pieces, applicants provide a tool supporting turret rotatable on an axis parallel to the work rotational axis, and supporting means for the turret including a turret rocker support disposed for rocking movement in a transverse plane on a tool slide which is movable longitudinally of the work rotational axis. The construction and arrangement of the tool supporting assembly is such as to permit movement of the turret and tool supported thereon radially toward and away from the work axis, and longitudinally thereof for the performance of any desired fashioning operation by the single point turning tool.

In the illustrated construction, movement of the tool slide axially of the work is controlled through appropriate connections from a cam on the operating cam shaft. Rocking movements of the rocker support to position the operating tool transversely with relation to the work are imparted from a second cam on the cam shaft through operating connections which include a cross slide carried on transversely extending ways on the machine frame, and guide and follower connections mounted respectively on the cross slide and upon the rocker support. In order to insure an accurate positioning of each successive operating tool in a limiting feed position in said transverse plane with respect to the work, applicants provide a series of adjustable stops on the rocker support which are arranged to be brought successively into position in timed relation with the indexing of the turret for successive engagement with a cooperating abutment on the tool slide.

Further in accordance with the invention, applicants provide automatic means for indexing the tool supporting turret and the adjustable stops associated therewith, and for locking these parts in each indexed position, together with electrically operated devices which are controlled from the operating cam shaft for effecting the operation of the turret indexing and locking devices in timed relation to the operation of the machine.

Referring more specifically to the drawings, the machine comprises a base 10 within which is mounted a spindle assembly adapted for continuously rotating the bar stock and for feeding successive portions of the same to the operating tools. This mechanism is located generally beneath the cover plate 12, and is not specifically illustrated, inasmuch as the spindle assembly is well known in the art, and forms specifically no part of the invention. The work engaging chuck at the forward end of the spindle assembly is generally indicated at 14 in Figs. 1 and 3 of the drawings. The base 10 has mounted thereon a guideway for a cross slide 18, and a guideway 20 for a tool slide 22 shiftable longitudinally of the work axis. The driving mechanism for the machine includes specifically the operating cam shaft 24 located on the base 10 at the front side of the machine. The cam shaft 24 is continuously driven at a slow rate from a belt pulley 26 through connections which may be assumed to include a main drive shaft extending along the rear side of the machine, and reduction gearing which in turn drives a cross shaft 28 and connecting mitre gears 30, 32 as indicated in dotted lines in Fig. 1. Inasmuch as these connections as thus far described, are well known in the art, and form specifically no part of the present invention, further illustration and description thereof has been omitted. A machine of this type having the construction above outlined, is illustrated, for example, in the publication entitled "Construction and use of automatic screw machines, copyright 1923, by Brown and Sharpe Manufacturing Company."

Applicants' improved tool supporting assembly adapted for the performance of a series of single point turning operations on each of successively positioned work pieces, comprises specifically a tool supporting turret 34 which is arranged with its rotational axis parallel to the work rotational axis, and is carried on a rocker support 36 pivotally mounted on the tool slide 22 to turn on an axis which is also arranged parallel to the work rotational axis. As best shown in Figs. 2 and 3 of the drawings, the rocker support 36 takes the form of a hollow frame or housing having formed in the opposite walls thereof bearing lugs 38 and 40 to receive a supporting pivot shaft 42 which is in turn mounted upon two upwardly extending arms 44 and 46 on the tool slide 22. A taper pin 47 passing radially through the lug 38 and pivot shaft 42 serves to secure the rocker support rigidly to the shaft. Identical collars 48 secured to the shaft 42 and arranged on opposite sides of the supporting arm 46 serve to secure the pivot shaft 42 against axial movement with relation to the tool slide 22 while permitting rotational movement of the rock shaft 42 and the rocker support 36 on the tool slide.

The mechanism herein provided for imparting positioning movements to the tool slide 22 and turret 34 supported thereon axially of the work, as best shown in Figs. 2 and 3 of the drawings, comprises a cam follower lever 50 pivotally supported on a stationary pivot stud 52 and having mounted at its free end a roller 54 for engagement with an axial motion producing cam 56 on the cam shaft 24. An upwardly extending arm 58 of the cam lever 50 has formed thereon a gear segment 60 for engagement with a gear segment 62 formed on one arm of a bell-crank actuating lever 64 mounted to turn on a vertical pivot pin 66 on the machine frame. The other arm of the bell-crank actuating lever 64 extends laterally across the tool slide 22, and is connected thereto by means of an adjustable slot and pin connection. This connection comprises specifically a block 68 slidable in a guideway 70 in the tool slide 22 and a pivot pin 72 which projects upwardly from the block through a slot 74 in the transversely extending arm of the bell-crank actuating lever 64. The pin 72 is fitted with washers which engage respectively against the upper and under side of the lever 64, and is screw-threaded to receive a clamping nut 75. Adjustment of the block 68 and pin 72 in the slot 74 on the actuating lever 64 serves to vary the length of the movement imparted to the tool slide 22 in each direction by the oscillatory movement of the bell-crank actuating lever 64. The construction and arrangement of the connections above described, are such as to cause a positive movement to be imparted to the tool slide 22 to the left. In order to impart a return movement of the tool slide 22 to the right, and to maintain the follower 54 in contact with its cam 56, a compression spring 76 is mounted in a bore 78 formed in the ways 20, being seated at its left hand end in the base of the bore, and at its other end against a block 82 secured to the under side of the tool slide 22.

For imparting rocking movements to the rocker support 36 to move the turret 34 and tools mounted thereon toward and away from the work, applicants provide the cross slide 18 which carries a guide member 84 having formed thereon a flat guiding surface 86 for engagement with a follower element in the form of a block 88 secured to a pivot pin 90 in a forwardly projecting lug 92 on the rocker support 36. A spring-pressed plunger 94 seated in a recess in the lug 92 is arranged to engage the follower 88 to maintain a substantially parallel relationship of the cooperating surfaces when the follower 88 is moved out of engagement with the guide surface 86. A plate 96 loosely mounted on the pin 90 is arranged to be swung in a counterclockwise direction from the inoperative position shown in Fig. 2, into engagement with the guide surface 86 to support the rocker support in a raised position wherein the cutting tools are removed from contact with the work to facilitate adjustment of the tools. A stop pin 98 supports the plate 96 in the inoperative position shown. The guiding surface 86 extends longitudinally in a plane parallel to the work rotational axis, and is sloped with relation to the direction of movement of the cross slide 18, so that movement of the cross slide 18 rearwardly will cause the follower 88 to ride upwardly on the guiding surface 86 to move the rocker support 36 and turret 34 upwardly and away from the rotational axis of the work, movement of the cross slide 18 forwardly being effective to permit movement of the rocker support 36 and turret 34 downwardly and toward the rotational axis of the work.

The guide member 84 is provided at its left hand end with a stock which is fitted within a split clamping collar 100 formed on a bracket 102 slidably mounted on an upwardly extending guideway 103 on the cross slide 18 for adjustment in a substantially vertical plane. At its opposite end the guide member 84 is provided with a roller 106 which rides on a supporting rest 108 adjustably mounted on a standard 110 on the machine frame. The rest 108 is vertically adjustable by means of adjusting screws 112, and is clamped rigidly in adjusted position by means of clamping screws 114 screw-threaded to the rest 108 and arranged to extend through vertical slots formed in the standard 110. In order to provide for an accurate angular adjustment of the guide member 84 and guide surface 86, as best shown in Figs. 1 and 2, a laterally extending plate 115 is rigidly secured to the bracket 102, and is provided at its outer end with two adjustable stop screws 116 arranged for engagement with the flattened under surface of the guide member 84 at opposite sides of its rotational axis.

Movement of the cross slide 18 is controlled by means of a cam 117 on the cam shaft 24, and a bell-crank cam lever 118 which is supported to turn on a pivot 120, and is provided at one end with a roller 122 for engagement with the cam 117. An upwardly extending arm of the bell-crank lever 118 has formed thereon a gear segment 124 for engagement with a rack 126 on the under side of the slide 18. The construction and arrangement of these connections is such that movement of the slide rearwardly to lift the turret and tool supported thereon away from the work is imparted positively by the cam 117. The cross slide 18 is moved in the opposite or forward direction by means of a compression spring 128 (see Fig. 3) coiled about a supporting plunger 130 and arranged at its forward end for engagement against an adjustable stop screw 132 on a laterally extending lug 134 of the cross slide 18. Adjustment of the cross slide 18 with relation to its actuating connections including the rack 126 is effected by means of a knurled adjusting nut 135 which is threaded to a threaded extension of the rack 126 projecting through a journal in the forward end of the cross slide 18. The cross slide 18 is held in its adjusted position in engagement with the adjusting nut 135 on the rack 126 by the action of the compression spring 128 above described.

The rocker support 36 is urged in a counterclockwise direction as viewed in Fig. 2, to engage the follower 88 against the guide surface 86 of member 84 by means of a vertically arranged compression spring plunger 136 mounted on a rearward extension of the rocker support 36 for engagement against an anvil 138 formed on the tool slide 22.

The tool supporting turret 34 as best shown in Fig. 4 of the drawings, is mounted on one end of a turret supporting shaft 140 which passes transversely through the rocker support 36, and is supported to turn therein on two end thrust roller bearings 142 and 144. In the outer face of the turret 34 are provided eight tool receiving sockets 146 for mounting tool supports 148 with their single point turning tools 150. In the opposite face of the turret 34, there are provided eight locking bolt receiving sockets 149 which are arranged to be engaged in turn by a locking bolt 151 for locking the turret in each of its successive indexed positions. The locking bolt 151 as best shown in Fig. 3, is supported for axial movement within a housing 152 formed in the rocker support 36, and is urged into locking position by means of a compression spring 153 coiled about the locking bolt 151 between a collar 154 and a shouldered portion 155 of the housing 152.

The construction and arrangement of applicants' tool supporting assembly in which the turret 34 is mounted to rotate in a plane normal to the work rotational axis, and in which the tool supports 148 with their single point turning tools 150 are mounted in the face of the turret, is well adapted to permit the supporting of the rotating work piece at a point immediately adjacent the point of operation on the work. In the illustrated construction, such a support is provided, as best shown in Fig. 3, in the form of a bracket 156 rigidly secured to the leading end of the tool slide 22, and provided with a split clamp bearing 157 to receive the rotating work piece.

In accordance with the usual practice in these machines, the work piece is arranged to be advanced against a stop in order to position each successive end portion thereof for the fashioning and subsequent cutting off of the finished article. In the present construction, a work stop 158 is provided as indicated in Fig. 3, supported for adjustment axially upon the tool slide 22. As will hereinafter appear, the tool slide is advanced to an extreme position to the left to bring the stop 158 into its operative position for the feeding of the bar stock thereagainst, the rocker support 36 and turret 34 at that time having been rocked upwardly and away from the work to an extreme clear position. Inasmuch as the zone of operation of the tool slide 22 during the subsequent turning operations is located further to the right, the stop 158 is moved therewith to the right and out of the way, and will therefore not interfere with the operation of the tool slide 22 during the performance of the several turning operations.

The locking bolt 151 is withdrawn to permit each successive indexing movement of the turret 34, and then is permitted to return to its locking position through the operation of electrically operated connections including a solenoid 160 mounted in the rearward extension of the rocker member 36. The solenoid 160 is of a conventional type having an armature 162 which is arranged to be held normally in extended position by spring means, and to be withdrawn by the magnetic attraction of the solenoid when energized. The spring means referred to, is conventionally shown in Figs. 2 and 3, to comprise a compression spring 163 coiled about a supporting pin 164 secured to the rear face of the solenoid 160 to extend within an axis bore in the armature 162. The spring 163 is seated at its outer end against the face plate supporting the pin 164 and at its other end against the inner end of the bore within the armature 162. The armature 162 is provided at its forward end with a clevis or transverse slotted portion within which is mounted a follower roll 165 carried on a vertical pivot pin 166 for engagement with a rearwardly extending tail of a lever 168 which extends within the transverse slot or clevis of the armature 162. The lever 168 is secured to the upper end of a vertically arranged rock shaft 170 which extends downwardly through the rocker support 36, and at its lower end carries an arm 172 connected at its free end to the rear end of the locking bolt 151. With this construction and arrangement of the lock bolt connections, it will readily be seen that the energizing of the magnet will cause the armature 162 to be drawn rearwardly into the solenoid 160, and through the engagement of the follower 165 with the tail of the lever 168 will act to withdraw the locking bolt 151 to permit the indexing of the turret 34. When the solenoid 160 is again de-energized, the armature 162 is permitted to move to its extended position under the influence of the spring 163, and the locking bolt 151 is again urged toward its locking position by the compression spring 154. For manual actuation of the locking bolt, the lever 168 is provided with a lateral extension 174 which projects outwardly through a slot 176 to permit convenient operation of the same by the operator.

Indexing movements are imparted to the turret 34 by means of electrically operated connections which include a solenoid 178 which is similar to the solenoid 160 above described, and is mounted in parallel relation therewith in the rearward extension of the rocker support 36. The solenoid 178 is provided with an armature 180 which is normally held in an extended position by a spring 181 (see Fig. 3), and is arranged to be withdrawn by the magnetic attraction of the solenoid when energized. The armature 180 is connected by means of a link 182 to one arm of a bell-crank indexing lever 184 mounted to turn on a vertically disposed pivot 186 on the rocker support 36. With this construction and arrangement of the actuating connections, the energizing of the solenoid 178 will cause the indexing lever 184 to be moved from the full line position shown in Fig. 5 leftwardly, to the position indicated by a dot-and-dash line. When the solenoid 178 is again de-energized, the indexing lever 184 is returned to its full line position at the right by the action of the spring 181 which acts to return the armature 180 to its extended position. The indexing lever 184 carries at its forward end a vertically arranged driving pin 188 which is arranged for engagement with spiral groove portions 190 formed in an indexing cam 192 on the turret supporting shaft 140. There are eight identical cam grooves formed at equally spaced intervals about the periphery of the indexing cam 192. Each of these grooves, as best shown in Fig. 5, is so formed that the engagement of the driving pin 188 therein during rocking movement of the indexing lever 184 from right to left, will cause the indexing cam and turret 34 supported therewith, to rotate through ⅛ of a complete revolution. At the completion of this rocking movement of the indexing lever 184 from right to left, the indexing cam 192 is so positioned that the driving pin 188 will register accurately with the next succeeding cam groove 190 for the next succeeding indexing operation.

In order that the indexing lever 184 may be again returned from left to right to its starting position without further changing the position of the indexing cam or turret, applicants have mounted the driving pin 188 to be shifted vertically between operative and inoperative positions with respect to the indexing cam 192. As best shown in Fig. 6, the driving pin 188 is arranged to be shifted vertically through a limited distance determined by the engagement of a stop pin 194 in the indexing lever 184 with a bevel portion 196 in the pin 188, this arrangement also acting to key the driving pin 188 against rotational movement in its support. A spring-pressed plunger 198 mounted within a bore 200 in the end of the indexing lever 184 is arranged for alternative engagement with two V-shaped slots 202 in the pin 188 to retain the pin yieldingly in either of its alternative operatitve or inoperative positions. The driving pin 188 is shifted to its raised inoperative position at the limit of movement of the indexing lever 184 from right to left by the engagement of the pin 188 with the surface of a conical-shaped cam 204 fitted to one end of the cam drum 192, the parts including particularly the driving pin 188 being shown in this limiting position in dot-and-dash lines in Fig. 4. As the indexing lever 184 is now returned to its starting position from left to right, the driving pin 188 is moved downwardly to its operating position by engagement of its upper end with a stationary cam 206 formed on the end of a machine screw threaded into the wall of the rocker support 36. Locking nuts 208 serve to lock the cam member 206 in adjusted position.

In order to insure the accurate location of the turret 34 in each of its successively indexed positions, so that the corresponding locking socket 149 will be properly registered to receive the locking bolt 151, the walls of the cam grooves 190 are projected over the conical cam 204 as a dwell portion, and are extended outwardly to maintain the operative engagement of the locking pin 188 in the associated cam groove as the locking pin is moved to its raised inoperative position. The operation of the electrical connections to de-energize the solenoids 160 and 178, as will hereinafter appear, is so timed as to permit the movement of the locking bolt 151 to its locking position before the driving pin 188 has moved out of engagement with the extended dwell portion of the cooperating cam groove 190.

Further in accordance with the present invention, applicants provide means operative for each successive indexed position of the turret 34 for positively limiting the rocking movement of the rocker support 36 and turret 34 toward the work, so that each successive tool will be brought accurately to a predetermined depth feed position in accordance with the requirements of the turning operation to be performed by the particular tool. For this purpose there is mounted on the right hand end of the turret supporting shaft 140, a stop disk 212 having mounted on the periphery thereof, eight adjustable stop screws 214 which are arranged to be brought successively into position for engagement with a cooperating stop surface 216 on the tool slide 22. In order to permit an accurate adjustment of the position of each of these stop screws 214, each screw is provided adjacent the outer end thereof with scale markings calibrated to permit accurate adjustment of the stop screws within the desired limit of accuracy. Locking screws 217 screw-threaded into the face of the disk 212 are arranged to engage with and to secure the stop screws 214 in their adjusted positions.

In the illustrated construction, the operation of the solenoids 160 and 178 is controlled to effect the unlocking and indexing of the turret 34, and the subsequent locking of the turret in its indexed position, by means of snap switches 220 and 222 which are arranged to be actuated by dogs on the cam shaft 24 of the machine. As best shown in Figs. 1, 2 and 3, the switches 220, 222 are mounted in a housing 224 secured to the front side of the machine frame substantially above the cam shaft 24. These switches are identical in construction and may be of any conventional type. For convenience of illustration, the construction of switch 222 is shown in somewhat diagrammatic form in Fig. 2, as comprising a contact arm 226 in the form of a leaf spring which is rigidly secured at one end, and is biased to remain normally in open position with respect to a contact 228. Intermediate its length the contact arm 226 is provided with a laterally extending actuating pin 230 which projects rearwardly through the casing of the switch 222. The mechanism for closing and opening the switch comprises a vertically arranged plunger 232 mounted for sliding movement in a U-shaped bracket 234, and having secured intermediate its length a collar 236. A compression spring 238 coiled about the plunger 232 between the upper end of the bracket 234 and the collar 236 tends normally to maintain the plunger in a fully depressed position as determined by the engagement of an enlarged head on the upper end of the plunger with the bracket 234. There is also pivotally mounted on the U-shaped bracket 234, a switch actuating arm 240 having an upward extension which is arranged for engaging contact with the switch actuating pin 230 and a lateral extension which for the low position of the plunger 232 above described, is engaged against the under side of the collar 236 holding the switch in its open position. A compression spring 244 coiled about the plunger 232 between the lower end of the U-shaped bracket 234 and the lateral extension of the switch arm 240 tends to move the switch arm to a contacting position when permitted by upward movement of the plunger 232. The plunger 232 is provided with a downward extension in the form of an actuating plunger 246 which projects through the lower side of the housing 224, and is yieldingly supported against and to move as a unit with the plunger 232 by means of a compression spring 248. The switch 220 has the identical construction of the switch 222 above described, and includes specifically a plunger 250 and actuating plunger 252 corresponding respectively with plunger 232 and actuating plunger 246 of the switch 222 (see Fig. 1).

The switches 220 and 222 above described, are arranged to be acted upon by means of a dog actuated switch lever 254 (see Figs. 1 and 2) which takes the form of a U-shaped frame pivotally mounted at opposite ends on a pivot pin 256. Two upwardly extending stop screws 258 and 260 are mounted on the switch lever 254 for engagement respectively with the actuating plungers 246 and 252. An upwardly extending arm 262 of the dog actuated switch lever 254 is arranged for engagement with an adjustable stop screw 264 on the rear side of the housing 224 to support the switch lever 254 in a limiting low inoperative position. As may be best seen in Fig. 1 of the drawings, the stop screws 258 and 260 are adjusted so that upward movement of the dog actuated switch lever 254 will cause the stop screw 260 to engage with and raise the actuating plunger 246 to close the switch 222 in advance of the closing of switch 220.

The dog actuated switch lever 254 is arranged to be acted upon successively by eight switch actuating dogs 266 which are supported on a dog supporting disk 268 on the cam shaft 24, these dogs being spaced adjustably about the periphery of the disk to effect each successive indexing operation at the proper point in the operating cycle of the machine. A follower element in the form of a plate 270 is mounted on one end of the dog actuated lever 254 for engagement successively with each of the dogs 266. The dogs 266 and the follower plate 270 are shaped so that the rotational movement of the cam shaft 24 will act to raise the dog actuated lever 254 gradually to its high position, and then to permit it to drop quickly to its limiting low inoperative position. The upward rocking movement thus imparted to the switch lever 254 will cause the switch 222 to be closed slightly in advance of the closing of switch 220, so that the solenoid 160 is energized to withdraw the locking bolt 151 before the solenoid 178 is energized to index the turret. As the dog actuated lever is then permitted to drop quickly to its low position at the completion of the indexing operation, the solenoids are de-energized substantially at the same time, so that the locking bolt 151 is permitted to return to its locking position before the driving pin 188 on the indexing lever 184 is moved out of engagement with the raised dwell portion of the cam groove 190, thus insuring the register of the locking bolt 151 with the aligned socket in the turret 34.

Applicants' machine is disclosed in the drawings set up for the manufacture of a staff such as that illustrated at 274 in Fig. 7, this figure showing the finished article on a scale approximately ten times its actual size. The construction and arrangement of the operating cams 56 and 117 for the performance of the several single point turning operations required, are shown in Fig. 8 in full scale. The disk 268 on which are mounted the several indexing switch actuating dogs 266, has been somewhat reduced in diameter in order to obtain a clear view of the cam 117. In the position shown in Fig. 8, in which the roller 122 is riding on a high portion of the cam 117, and the roller 54 is engaged with an extreme high portion of the cam 56, the rocker support 36 carrying the turret 34 has been rocked to an extreme clear position away from the work, and the tool slide 22 is in its most advanced position in which the work stop 158 is located to stop and to position the leading end of the bar in operating position. During continued rotation of the cam shaft 24, and as the roller 54 rides onto the drop portion of the cam 56, the tool slide 22 is shifted to a fully retracted position to the right, and the dog 266 corresponding with position A in Fig. 8 engages the plate 270 to index the turret 34. During rotation of the cam shaft 24 from position A to position B, a rough turning operation is performed on the outer or right hand end of the staff 274 illustrated in Fig. 7 to rough cut the stem 276. When position B is reached, the turret is again indexed and a second turning tool is positioned for the performance of an operation to turn the tapered tip of the stem 276 at the outer end of the staff. At position C the turret 34 is retracted and indexed, and is then fed inwardly, the tool slide 22 remaining stationary to form the shoulder 278, and the tool slide 22 is then moved to the right to finish turn the stem 276 at the outer end of the staff. At position D the turret is again indexed and the diameter 280 is turned to size. At position E the turret is again indexed and is fed inwardly toward the work, and the taper portion 282 of the staff is formed. In position F the turret is again indexed and is fed still further inwardly toward the work for the performance of a rough turning cut upon the stem 284 at the inner or left hand of the staff. In position G the turret is again indexed and the shoulder 286 is formed, is then fed inwardly still further for the performance of a finish turning cut upon the stem 284 at the inner end of the staff. In position H the last indexing operation of the series takes place, bringing the cutting-off tool into position to form the tapered point of the stem 284 and to cut off the finished staff. Finally, as the position illustrated in Fig. 8 is again reached, the rocker support 36 and turret 34 are moved to a fully retracted position, and the tool slide 22 is advanced to its limiting position to the left to position the stop 158 for the positioning of the leading end of the bar. The operating cycle above described is then repeated.

While the machine and the operation thereof for the manufacture of the staff illustrated in Fig. 7 has been specifically described, it will be understood that the machine is well adapted for the manufacturing of other small parts by means of a series of single point turning operations, and that any desired arrangement of and shape of the cams 56 and 117, and a corresponding disposition of indexing dogs 266 may be employed adapted for the manufacture of such parts.

It will be understood that the invention is not limited to the specific embodiment shown, and that various deviations may be made therefrom without departing from the spirit and scope of the appended claims.

What is claimed is:

1. In an automatic screw or similar machine for fashioning articles successively from bar stock, a tool supporting and actuating mechanism arranged for effecting a series of single point turning operations upon a rotating work piece, which comprises a tool supporting turret, a tool slide shiftable axially of the work, and a turret support pivotally mounted on the slide for moving the turret transversely toward and away from the work, automatic means for actuating said slide and for indexing said turret and yielding means for feeding the turret support and turret toward the work for the performance in a continuous automatic cycle of a series of single point turning operations upon a work piece.

2. In an automatic screw or similar machine for fashioning articles successively from bar stock, a tool supporting and actuating mechanism, which comprises a tool supporting turret, a tool slide shiftable axially with the work, and a turret support shiftable on the slide for moving the turret transversely toward and away from the work, and automatic means for actuating said slide, for indexing said turret, and for moving the turret support toward and away from the work including means for yieldably feeding the turret support and turret toward the work, and stop means including a stop surface on the turret support for limiting said yieldable movement of the turret support and turret toward the work for each successive indexed position of the turret, for the performance in a continuous cycle of a series of single point turning operations upon a work piece.

3. In an automatic screw or similar machine for fashioning articles successively from bar stock, a tool supporting and actuating mechanism which comprises a tool supporting turret, a tool slide shiftable axially of the work, and a rocker turret support pivotally mounted on the slide for moving the turret transversely of the work axis toward and away from the work, and automatic means for actuating said slide, for indexing said turret, and for rocking the turret support toward and away from the work including means for yieldably feeding the rocker turret support and turret toward the work, and stop means for limiting said yieldable movement of the turret support and turret toward the work for each successive indexed position of the turret, for the performance in a continuous cycle of a series of single point turning operations upon a work piece.

4. In an automatic screw or similar machine for fashioning articles successively from bar stock, a tool supporting and actuating mechanism which comprises with actuating means, a rotatable tool supporting turret, a tool slide movable axially with the work, a rocker turret support pivotally mounted on said slide for effecting movement of the turret transversely of the work axis toward and away from the work, spring means tending to rock the rocker support and turret toward the work axis, guide and follower elements effective to control movement of the rocker support and turret toward and away from the work axis against the influence of said spring means, means for indexing the turret, and cooperating stop surfaces on the rocker support and on the tool slide to limit the transverse movement of the turret toward the work axis in each indexed position of the turret.

5. In an automatic screw or similar machine for fashioning articles successively from bar stock, a tool supporting and actuating mechanism arranged for effecting a series of single point turning operations upon a rotating work piece, which comprises a tool supporting turret rotatable on an axis parallel to the work axis, a tool slide movable axially of the work, and a rocker turret support pivotally mounted on said slide for effecting movement of the turret toward and away from the work, and automatic means for actuating said slide and rocker support and for indexing said turret for the performance in an automatic cycle of a series of single point turning operations upon a work piece, said automatic means including yieldable means for urging the rocker support toward the work, and means acting against the influence of said yieldable means comprising a rocker cam, connections therefrom including a guide member shiftable by said cam in a plane transverse to the work axis and having a guide surface extending in a plane parallel to said work axis, and a follower element on said rocker support for engagement with said guide member.

6. In an automatic screw or similar machine for fashioning articles successively from bar stock, a tool supporting and actuating mechanism arranged for effecting a series of single point turning operations upon a rotating work piece, which comprises a tool supporting turret rotatable on an axis parallel to the work axis, a tool slide movable axially of the work, and a rocker turret support pivotally mounted on said slide for effecting movement of the turret transversely toward and away from the work, automatic means for actuating said slide and rocker support and for indexing said turret for the performance in an automatic cycle of a series of single point turning operations upon a work piece, said automatic means including spring means urging the rocker support and turret toward the work axis, a rocker cam, a cross slide actuated thereby, a guide member on the cross slide having a guide surface extending in a plane parallel to said work axis, and a follower element on said rocker support for engagement with said guide surface.

7. In an automatic screw or similar machine for fashioning articles successively from bar stock, a tool supporting and actuating mechanism arranged for effecting a series of single point turning operations upon a rotating work piece, which comprises a tool supporting turret rotatable on an axis parallel to the work axis, a tool slide movable axially of the work, and a rocker turret support pivotally mounted on said slide for effecting movement of the turret toward and away from the work, automatic means for actuating said slide and rocker support and for indexing said turret for the performance in an automatic cycle of a series of single point turning operations upon a work piece, said automatic means comprising a stop surface on the tool slide, a series of stops associated with the turret on the rocker support, means for indexing the turret and said stops therewith to position said stops successively for engagement with said stop surface to limit transverse movement of the turret toward the work axis in each indexed position of the turret, spring means urging the rocker support and turret toward the work axis, a rocker cam, a cross slide actuated thereby, a guide member on the cross slide having a guide surface extending in a plane parallel to said work axis, and a follower element on said rocker support for engagement with said guide member operative during movement of the cross slide in one direction to move the rocker support and turret away from the work axis.

8. In an automatic screw or similar machine for fashioning articles successively from bar stock, a tool supporting and actuating mechanism arranged for effecting a series of single point turning operations upon a rotating work piece, which comprises a tool supporting turret having its axis parallel to the work axis, and a plurality of supports on which the turret is movable axially of and transversely away from the work, and automatic means for actuating said supports and for indexing said turret for the performance in a continuous automatic cycle of a series of single point turning operations upon a work piece comprising indexing means for the turret, locking means for locking the turret in each of its indexed positions, solenoids for actuating each of said indexing and locking means, switch connections automatically operable for energizing and de-energizing said solenoids, and operating means for controlling the operation of said switch connections in sequence for energizing the solenoid for the locking means, thereafter for energizing the solenoid for the indexing means.

9. In an automatic screw or similar machine for fashioning articles successively from bar stock, a tool supporting and actuating mechanism arranged for effecting a series of single point turning operations upon a rotating work base, which comprises a tool supporting turret and supporting means on which the turret is movable toward and away from the work, and automatic means for moving the turret toward and from the work and for indexing the turret for the performance in a continuous automatic cycle of a series of single point turning operations including indexing mechanism for said turret comprising a cam drum connected to turn with the turret and having actuating surfaces on the periphery thereof, an indexing lever pivotally mounted on said supporting means for oscillatory indexing and return movement, a driving element on the indexing lever shiftable into and out of operative relation to said peripheral surfaces, means for oscillating the indexing lever to index the turret, and means operable at the limit of the return movement of the indexing lever to shift the driving element into operative relation to said peripheral surfaces and operable at the limit of the indexing movement of said lever to shift the driving element out of operative relation to said surfaces.

10. In an automatic screw or similar machine for fashioning articles successively from bar stock, a tool supporting and actuating mechanism arranged for effecting a series of single point turning operations upon a rotating work piece, which comprises a tool supporting turret, a tool slide shiftable axially of the work, a rocker turret support pivotally mounted on the tool slide, automatic means for actuating said slide and said rocker support and for indexing said turret for the performance in a continuous automatic cycle of a series of single point turning operations upon a work piece including yielding means for feeding the rocker support and turret toward the work, and cooperating stop surfaces located on the rocker support and on the tool slide for limiting movement of the rocker support and turret toward the work in each of the indexing positions of said turret.

11. In an automatic screw or similar machine for fashioning articles successively from bar stock, a tool supporting and actuating mechanism arranged for effecting a series of single point turning operations upon a rotating work piece, which comprises a tool supporting turret and supporting means on which the turret is movable toward and away from the work, and automatic means for actuating said supporting means and for indexing said turret for the performance of said operations upon the work piece comprising an indexing solenoid and connections therefrom for indexing the turret, locking means for locking the turret in its indexed position, and a solenoid operable for releasing and for re-establishing said locking means, limit switches for controlling each of said solenoids, a cam shaft, a dog on the cam shaft, and a connection actuated thereby for actuating said lock control limit switch and thereafter for actuating said indexing limit switch.

12. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movements having a cam engaging driving element thereon, and a cam drum supported to turn with the turret having a series of spiral cam surfaces arranged to be engaged successively by said driving element during successive oscillatory indexing movements of the indexing lever in one direction to effect successive indexing movements of the turret.

13. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movements, and a driving element shiftably supported on the indexing lever, a cam drum having a series of spiral cam surfaces arranged to be engaged successively by said driving element during successive oscillatory indexing movements of the indexing lever in one direction, and means for controlling the position of said driving element acting to position said driving element for engagement with the associated cam surface at the limit of the return movement of the indexing lever and acting to position said driving element in inoperative position at the limit of the indexing movement of the indexing lever.

14. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movement and having a driving pin axially shiftable thereon, a cam drum having a series of spiral cam grooves arranged to be engaged successively by said pin during successive oscillatory indexing movements of the indexing lever in one direction, cam means associated with the drum for shifting the pin to an inoperative position at the limit of the indexing movement of the indexing lever, and a cam arranged to shift the pin to its operative position at the limit of the return movement of the indexing lever.

15. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movements and having a cam engaging element thereon, a cam drum supported to turn with the turret, having a series of spiral cam surfaces arranged to be engaged successively by said driving element during successive oscillatory indexing movements of the indexing lever in one direction to index the turret, and means for locking the turret and said cam drum in each successively indexed position.

16. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movements and having a cam engaging driving element shiftably mounted thereon, a cam drum having a series of spiral cam grooves arranged to be engaged successively by said driving element during successive oscillatory indexing movements of the indexing lever in one direction to index the turret, shifting means for said driving element arranged to position said element in cam engaging position at the limit of the return movement of the indexing lever and to position the driving element in inoperative position at the limit of the indexing movement of said lever, locking means for locking the turret and drum in each successive indexed position, and automatically operated means for controlling the operation of said indexing lever and for actuating said locking means in timed relation thereto.

17. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movements and having an axially shiftable driving pin supported thereon, a cam drum supported to turn with the turret having a series of spiral cam grooves terminating at one end in a raised dwell portion and having their opposite ends spaced to be engaged successively by said pin during successive oscillatory indexing movements of the indexing lever, cam means associated with the drum for shifting the pin to a raised inoperative position in engagement with said raised dwell portion of the groove, cam means for shifting the pin to a cam engaging position at the limit of the return movement of the indexing lever, locking means for locking the turret in each successively indexed position, and means for controlling the operation of the locking means in timed relation to the movement of the indexing lever to release the locking means during the indexing movement of the lever and to re-establish said locking means before the pin moves out of engagement with said raised dwell portion of the associated cam groove during the return movement of the indexing lever.

18. In an automatic screw or similar machine for fashioning articles successively from bar stock, tool supporting and actuating mechanism including a rotatable tool supporting turret, and supporting means on which the turret is movable toward and away from the work, indexing mechanism for the turret including an indexing lever arranged for oscillatory indexing and return movements and having an axially shiftable driving pin supported thereon, a cam drum supported to turn with the turret having a series of spiral cam grooves terminating at one end in a raised dwell portion and having their opposite ends spaced to be engaged successively by said pin during successive oscillatory indexing movements of the indexing lever, cam means associated with the drum for shifting the pin to a raised inoperative position in engagement with the raised dwell portion of the groove at the limit of the indexing movement of the indexing lever, cam means for shifting the pin to a cam engaging position at the limit of the return movement of the indexing lever, a locking bolt and a series of sockets associated with the turret to receive the bolt in each successively indexed position of the turret, solenoids for actuating each of said indexing lever and locking bolt, and means for energizing and de-energizing said solenoids in timed relation to one another to withdraw the locking bolt prior to the indexing movement of the indexing lever, and to cause the locking bolt to be returned to locking position and to effect a return movement of the indexing lever timed to move the driving pin out of engagement with said dwell portion only after the locking bolt is engaged within its cooperating socket.

19. In an automatic screw or similar machine for fashioning articles successively from bar stock, tool supporting and actuating mechanism including a rotatable tool supporting turret, and supporting means on which the turret is movable toward and away from the work, an indexing lever arranged for oscillatory indexing and return movements and having a cam engaging driving element thereon, a cam drum supported to turn with the turret having a series of spiral cam grooves arranged to be engaged successively by said driving element during successive oscillatory indexing movements of the indexing lever in one direction to index the turret, a locking bolt on said turret supporting means, and cooperating sockets associated with the turret to receive the locking bolt in each of the indexed positions of the turret, a solenoid connected to actuate said indexing lever, a second solenoid connected to control the position of said locking bolt, an actuating switch for each of said solenoids, and means acting when rendered operative for actuating one of said switches and the solenoid associated therewith to withdraw the locking bolt, and thereafter to actuate the other of said switches and solenoid associated therewith to impart an indexing movement to the indexing lever.

20. In an automatic screw or similar machine for fashioning articles successively from bar stock, a tool supporting and actuating mechanism which comprises a rotatable tool supporting turret, a tool slide movable axially of the work, a rocker turret support pivotally mounted on said slide for effecting movement of the turret toward and away from the work transversely of the work axis, yielding means for feeding the rocker support and turret toward the work, and adjustable stop pins for limiting said feeding movement.

21. In an automatic screw or similar machine for fashioning articles successively from bar stock, a tool supporting and actuating mechanism which comprises a tool supporting turret rotatable on an axis parallel to the work axis, a tool slide movable axially of the work, a rocker turret support pivotally mounted on said slide for effecting movement of the turret transversely of the work axis toward and away from the work, yielding means for feeding the rocker support and turret toward the work, positively acting means for controlling said feeding movement, and adjustable stop means for limiting said feeding movement.

22. In an automatic screw or similar machine for fashioning articles successively from bar stock, a tool supporting and actuating mechanism which comprises a rotatable tool supporting turret, a tool slide movable axially of the work, a rocker turret support pivotally mounted on said slide for effecting movement of the turret transversely of the work axis toward and away from the work, a cross slide, and cooperating guide and follower elements on said cross slide and rocker support whereby movement of the cross slide is effective to impart positioning movements to the turret transversely of the work axis.

23. In an automatic screw or similar machine for fashioning articles successively from bar stock, a tool supporting and actuating mechanism which comprises a rotatable tool supporting turret, a tool slide movable axially of the work, a rocker turret support pivotally mounted on said slide for effecting movement of the turret transversely of the work axis toward and away from the work, a cross slide, cooperating guide and follower elements on said cross slide and rocker support whereby movement of the cross slide is effective to impart positioning movements to the turret transversely of the work axis, means for indexing the turret, and cooperating stop surfaces on the rocker support and on the tool slide to limit the transverse movement of the turret toward the work axis in each indexed position of the turret.

24. In an automatic screw or similar machine for fashioning articles successively from bar stock, a tool supporting and actuating mechanism which comprises a rotatable tool supporting turret, a tool slide movable axially with the work, a rocker turret support pivotally mounted on said slide for effecting movement of the turret transversely of the work axis toward and away from the work, spring means tending to rock the rocker support and turret toward the work axis, a cross slide, cooperating guide and follower elements on said cross slide and rocker support so arranged that movement of the cross slide in one direction is effective to rock the rocker support and turret away from the work axis, means for indexing the turret, and cooperating stop surfaces on the rocker support and on the tool slide to limit the transverse movement of the turret toward the work axis in each indexed position of the turret.

25. In an automatic screw or similar machine for fashioning articles successively from bar stock, a tool supporting and actuating mechanism which comprises a rotatable tool supporting turret, a tool slide movable axially of the work, a rocker turret support pivotally mounted on said slide for effecting movement of the turret transversely of the work axis toward and away from the work, a cross slide, cooperating guide and follower elements on said cross slide and rocker support whereby movement of the cross slide is effective to impart positioning movements to the turret transversely of the work axis, a stop surface on the tool slide, and a series of stops associated with the turret on the rocker support, and means for indexing the turret and said stops therewith to position said adjustable stops successively for engagement with said stop surface to limit transverse movement of the turret toward the work axis in each indexed position of the turret.

26. In an automatic screw or similar machine for fashioning articles successively from bar stock, a tool supporting and actuating mechanism which comprises a tool supporting turret rotatable on an axis parallel to the work axis, a tool slide movable axially of the work, a rocker turret support pivotally mounted on said slide for effecting movement of the turret transversely toward and away from the work, spring means tending to rock the rocker support and turret toward the work axis, a cross slide, a guide element on the cross slide comprising a flat surface lying in a plane parallel to the work axis, and a follower element on the rocker support, said guide surface and follower element being so arranged that movement of the cross slide in one direction is effective to rock the rocker support and turret away from the work axis.

27. In an automatic screw or similar machine for fashioning articles successively from bar stock, a tool supporting and actuating mechanism which comprises a tool supporting turret rotatable on an axis parallel to the work axis, a tool slide movable axially of the work, a rocker turret support pivotally mounted on said slide for effecting movement of the turret toward and away from the work, spring means tending to rock the rocker support and turret toward the work axis, a cross slide, a guide element on the cross slide comprising a flat surface lying in a plane parallel to the work axis, a follower element on the rocker support, said guide surface and follower element being so arranged that movement of the cross slide in one direction is effective to rock the rocker support and turret away from the work axis, and means for adjusting said guide element angularly about an axis parallel to the work axis.

28. In an automatic screw or similar machine for fashioning articles successively from bar stock, a tool supporting and actuating mechanism which comprises a tool supporting turret rotatable on an axis parallel to the work axis, a tool slide movable axially of the work, a rocker turret support pivotally mounted on said slide for effecting movement of the turret toward and away from the work, spring means tending to rock the rocker support and turret toward the work axis, a cross slide, a guide element on the cross slide comprising a flat surface lying in a plane parallel to the work axis, a follower element on the rocker support, said guide surface and follower element being so arranged that movement of the cross slide in one direction is effective to rock the rocker support and turret away from the work axis, a stop surface on the tool slide, a series of stops associated with the turret on the rocker support, and means for indexing the turret and said stops therewith to position said adjustable stops successively for engagement with said stop surface to limit transverse movement of the turret toward the work axis in each indexed position of the turret.

29. In an automatic screw or similar machine for fashioning articles successively from bar stock, a tool supporting and actuating mechanism which comprises a tool supporting turret, a tool slide shiftable axially with the work, and a turret support shiftable on the slide for moving the turret transversely toward and away from the work, and automatic means for actuating said slide, for indexing said turret, and for moving the turret support toward and away from the work including means for yieldably feeding the turret support and turret toward the work, and guide and follower elements effective to control the movement of the turret support against the influence of said spring means, and cooperating stop surfaces on the turret support and on the tool slide to limit the transverse movement of the turret toward the work axis in each indexed position of the turret.

CHARLES A. RICH.
WILLIAM E. TWAMLEY.